US010776835B2

(12) United States Patent
Kurosawa (10) Patent No.: US 10,776,835 B2
(45) Date of Patent: Sep. 15, 2020

(54) INFORMATION PROCESSING APPARATUS, INFORMATION PROCESSING METHOD, PROGRAM, AND RECORDING MEDIUM

(71) Applicant: Rakuten, Inc., Tokyo (JP)

(72) Inventor: Takayuki Kurosawa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 494 days.

(21) Appl. No.: 15/128,675

(22) PCT Filed: Mar. 25, 2014

(86) PCT No.: PCT/JP2014/058213
§ 371 (c)(1),
(2) Date: Sep. 23, 2016

(87) PCT Pub. No.: WO2015/145564
PCT Pub. Date: Oct. 1, 2015

(65) Prior Publication Data
US 2017/0124605 A1    May 4, 2017

(51) Int. Cl.
*G06Q 30/02*   (2012.01)
*G06Q 10/02*   (2012.01)
(Continued)

(52) U.S. Cl.
CPC ......... *G06Q 30/0282* (2013.01); *G06Q 10/02* (2013.01); *G06Q 10/06* (2013.01); *G06Q 10/0631* (2013.01); *G06Q 50/12* (2013.01)

(58) Field of Classification Search
CPC ........... G06Q 30/0282; G06Q 10/0631; G06Q 10/06; G06Q 50/12; G06Q 10/02
(Continued)

(56) References Cited

U.S. PATENT DOCUMENTS 7,328,166 B1 *  2/2008  Geoghegan ............ G06Q 10/02
                                                        705/5
8,768,379 B2 *  7/2014  Busch ................ G06Q 30/0236
                                                        455/456.1
(Continued)

FOREIGN PATENT DOCUMENTS

CN    102970337 A      3/2013
EP      1941434 A2 *   7/2008   ............. G06Q 10/02
(Continued)

OTHER PUBLICATIONS

NN8803430, Automated Hotel Check-in Terminal, IBM Technical Disclosure Bulletin, Mar. 1988. (Year: 1988).*
(Continued)

*Primary Examiner* — Minnah L Seoh
*Assistant Examiner* — Debra L Glennie
(74) *Attorney, Agent, or Firm* — Sughrue Mion, PLLC (57) ABSTRACT

An information processing apparatus includes a communication unit that is communicable with a user terminal. A storage unit stores reservation information relating to a use reservation for a facility of a user having the user terminal, the reservation information including an estimated facility use start time and an estimated facility use end time. A control unit controls the communication unit to receive, from the user terminal, a posting request of a review of the user about the facility, the posting request including text information or image information having a time stamp indicating recording date and time. The control unit controls, based on the reservation information, the posting request to prevent posting of a review including text information or image information having a time stamp indicating a point of time outside a period of time from the estimated facility use start time to the estimated facility use end time.

22 Claims, 6 Drawing Sheets

(51) Int. Cl.
*G06Q 50/12* (2012.01)
*G06Q 10/06* (2012.01)

(58) Field of Classification Search
USPC .......................................................... 705/347
See application file for complete search history.

(56) References Cited

U.S. PATENT DOCUMENTS

| | | | | |
|---|---|---|---|---|
| 10,148,762 | B2* | 12/2018 | Rogers | H04L 67/141 |
| 2001/0017668 | A1* | 8/2001 | Wilcock | H04N 1/00196 |
| | | | | 348/552 |
| 2008/0114748 | A1* | 5/2008 | Varner | G06Q 30/02 |
| 2008/0243631 | A1* | 10/2008 | Kane | G06F 17/3089 |
| | | | | 705/14.5 |
| 2008/0306826 | A1* | 12/2008 | Kramer | G06Q 30/02 |
| | | | | 705/14.14 |
| 2009/0027223 | A1* | 1/2009 | Hill | G06Q 30/02 |
| | | | | 340/686.6 |
| 2009/0313053 | A1* | 12/2009 | Gengarella | G06Q 30/02 |
| | | | | 705/5 |
| 2011/0093340 | A1* | 4/2011 | Kramer | G06Q 30/02 |
| | | | | 705/14.58 |
| 2012/0221479 | A1* | 8/2012 | Schneck, III | G06Q 30/0631 |
| | | | | 705/347 |
| 2014/0081633 | A1* | 3/2014 | Badaskar | G10L 15/26 |
| | | | | 704/235 |
| 2015/0213522 | A1 | 7/2015 | Gao | |

FOREIGN PATENT DOCUMENTS

| | | |
|---|---|---|
| JP | 2009-180675 A | 8/2009 |
| JP | 2011-221804 A | 11/2011 |
| JP | 2012-27603 A | 2/2012 |
| JP | 2013-8096 A | 1/2013 |
| JP | 5357367 B1 | 12/2013 |
| WO | 2012/176497 A1 | 12/2012 |

OTHER PUBLICATIONS

Hsien-Tang-Lin, Applying Location Based Services and Social Network Services onto Tour Recording, 2012 Ninth International Joint Conference on Computer Science and Software Engineering. pp. 197-199 (Year: 2012).*

International Search Report for PCT/JP2014/058213 dated Apr. 22, 2014.

* cited by examiner

INFORMATION PROCESSING APPARATUS, INFORMATION PROCESSING METHOD, PROGRAM, AND RECORDING MEDIUM

CROSS REFERENCE TO RELATED APPLICATIONS

This application is a National Stage of International Application No. PCT/JP2014/058213 filed Mar. 25, 2014, the contents of which are incorporated herein by reference in its entirety.

TECHNICAL FIELD

The present invention relates to an information processing apparatus that is capable of receiving an input of review information on a facility, which is made by a user who has used the facility, and to an information processing method, a program, and a recording medium in the information processing apparatus.

BACKGROUND ART

Conventionally, for example, some facility use reservation services of accommodation reservation sites and the like enable users to post their impression (reviews) about facilities that they have used (e.g., see Patent Document 1 below).

The reviews are useful for users other than the review posting users to reserve the use of the facilities and for staffs of facilities to improve their services.

Patent Document 1: Japanese Patent No. 5357367

SUMMARY OF INVENTION

Problem to be Solved by the Invention

By the way, such reviews are posted after the users use facilities. Therefore, every time the users post the reviews, they need to recall their impression that they felt during use of the facilities and to reproduce it in their reviews. The user's recalling work is troublesome. In addition, if the user's memories are vague, evaluations different from what they felt during use of the facilities may be posted as the reviews.

In view of the above-mentioned circumstances, it is an object of the present invention to provide an information processing apparatus, an information processing method, a program, and a recording medium, by which it is possible to reduce the complications when a user creates a review about a facility used by the user and at the same time to reflect a real time impression about the used facility to the review after use of the facility.

Means for Solving the Problem

In order to the above-mentioned problem, an information processing apparatus according to an embodiment of the present invention includes a communication unit, a storage unit, and a control unit. The communication unit is communicable with a user terminal. The storage unit stores reservation information relating to a use reservation for a facility of a user having the user terminal, the reservation information including an estimated facility use start time and an estimated facility use end time. The control unit is capable of controlling the communication unit to receive, from the user terminal, a posting request of a review of the user about the facility, the posting request including text information or image information having a time stamp indicating recording date and time. Further, the control unit is capable of controlling, based on the reservation information, the posting request to prevent posting of a review including text information or image information having a time stamp indicating a point of time outside a period of time from the estimated facility use start time to the estimated facility use end time.

With this, the information processing apparatus causes the user to record information during use of the facility and then use it for creating the review, and hence it is possible to reduce the complications when the user creates the review about the used facility. Further, a material usable for the review is limited to those recorded during use of the facility, and hence the real time impression about the facility used by the user can be reflected to the review after use of the facility.

The user terminal may include an application for recording the text information or the image information. In this case, the control unit may control the communication unit to transmit a recording permission signal for permitting the recording by the application to the user terminal when the estimated use start time comes and to transmit a recording limitation signal for limiting the recording by the application to the user terminal when the estimated use end time comes.

With this, the user limits a period for which the text information or the image information can be recorded by the application to the period for which the user uses the facility, and hence the information processing apparatus can limit the text information or the image information used for the review to one recorded during use of facility of the user. Thus, the authenticity of the review can be ensured.

The application may be capable of editing review using the text information or the image information. In this case, the control unit may control the communication unit to transmit an editing permission signal for permitting the editing by the application to the user terminal when the estimated use end time comes.

With this, the information processing apparatus can prevent the review from being generated before the user terminates the use of the facility.

The user terminal may obtain position information of the user terminal. In this case, the storage unit may store, as the reservation information, facility position information indicating a position of the facility whose use is reserved by the user. Further, in this case, the control unit may control the communication unit to receive, from the user terminal, user position information indicating a position of the user terminal and may control the storage unit to store the received user position information in association with a time stamp indicating a point of time of the reception. In addition, the control unit may control the review posting request to prevent posting of the review including the text information or the image information having a time stamp indicating a point of time when the position of the user terminal is away from the position of the facility by a predetermined distance or longer.

With this, the information processing apparatus knows the position of the user terminal, and hence can limit the text information or the image information included in the review to the text information or the image information actually recorded by the user in the facility or near the facility.

The communication unit may be communicable with a facility terminal that is placed in the facility and capable of recording a check-in time and a check-out time of the user with respect to the facility. In this case, the control unit may control the communication unit to receive the check-in time and the check-out time from the facility terminal. In addition, the control unit may control the review posting request to prevent posting of the review including the text information or the image information having a time stamp indicating a point of time outside a period of time from the check-in time to the check-out time.

With this, the information processing apparatus knows the check-in/check-out time of the user, and hence can limit the text information or the image information included in the review to the text information or the image information actually recorded by the user in the facility or near the facility.

The user terminal may include an application for recording the text information or the image information. In this case, the control unit may control the communication unit to transmit information for urging the user to perform the recording by the application to the user terminal when the estimated use start time comes.

With this, the information processing apparatus urges the user to record the text information and the image information when the user arrives at the facility, and hence can cause the user to record the text information and the image information used for the review during use of the facility. Thus, it is possible to reduce the burden on the user during posting of the review.

The application may be capable of editing review using the text information or the image information. In this case, the control unit may control the communication unit to transmit information for urging the user to perform the editing processing by the application to the user terminal when the estimated use end time comes.

With this, the information processing apparatus urges the user to edit the review using the text information and the image information when the user moves away from the facility, and hence can rapidly post the review.

The control unit may control, if the posting request includes text information or image information having a time stamp indicating a point of time outside a period of time from the estimated facility use start time to the estimated facility use end time, the communication unit to transmit information indicating the fact that the text information or the image information is prohibited to be used for the review to the user terminal.

With this, the information processing apparatus enables the user to know the text information or the image information that is prohibited to be used for the review.

The control unit may receive the recorded text information or image information at each time of the recording and control the communication unit to upload the received text information or image information into a predetermined web site.

With this, the information processing apparatus publishes the real time impression or the image during use of the facility of the user on the web site, separately from the review posted after use of the facility, and hence can provide information having presence that is different from the review of the facility to another user.

An information processing method according to another aspect of the present invention includes:

storing reservation information relating to a use reservation for a facility of a user having a user terminal, the reservation information including an estimated facility use start time and an estimated facility use end time;

receiving, from the user terminal, a posting request of a review of the user about the facility, the posting request including text information or image information having a time stamp indicating recording date and time; and controlling, based on the reservation information, the posting request to prevent posting of a review including text information or image information having a time stamp indicating a point of time outside a period of time from the estimated facility use start time to the estimated facility use end time.

A program according to still another aspect of the present invention causes an information processing apparatus to execute the steps of:

storing reservation information relating to a use reservation for a facility of a user having a user terminal, the reservation information including an estimated facility use start time and an estimated facility use end time;

receiving, from the user terminal, a posting request of a review of the user about the facility, the posting request including text information or image information having a time stamp indicating recording date and time; and controlling, based on the reservation information, the posting request to prevent posting of a review including text information or image information having a time stamp indicating a point of time outside a period of time from the estimated facility use start time to the estimated facility use end time.

A recording medium according to still another aspect of the present invention records a program that causes an information processing apparatus to execute the steps of:

storing reservation information relating to a use reservation for a facility of a user having a user terminal, the reservation information including an estimated facility use start time and an estimated facility use end time;

receiving, from the user terminal, a posting request of a review of the user about the facility, the posting request including text information or image information having a time stamp indicating recording date and time; and controlling, based on the reservation information, the posting request to prevent posting of a review including text information or image information having a time stamp indicating a point of time outside a period of time from the estimated facility use start time to the estimated facility use end time.

A program according to still another aspect of the present invention causes an information processing apparatus to execute the steps of:

storing reservation information relating to a use reservation for a facility of a user, the reservation information including an estimated facility use start time and an estimated facility use end time;

recording, according to an input of the user, text information or image information that can be used for generating a review about a facility together with a time stamp indicating recording date and time thereof;

generating the review based on text information or image information of the recorded text information or image information, which has a time stamp indicating a point of time that is from the estimated facility use start time to the estimated facility use end time; and transmitting a posting request of the review together with the generated review to a server apparatus.

With this, the information processing apparatus causes the user to record during use of the facility and then use it for creating the review, and hence it is possible to reduce the complications when the user creates the review about the used facility. Further, a material usable for the review is limited to those recorded during use of the facility, and hence the real time impression about the facility used by the user can be reflected to the review after use of the facility.

As described above, according to the present invention, it is possible to reduce the complications when a user creates a review about a facility used by the user and at the same time to reflect a real time impression about the used facility to the review after use of the facility. However, the effects described herein do not necessarily limit the present invention.

MODE(S) FOR CARRYING OUT THE INVENTION

Hereinafter, an embodiment of the present invention will be described with reference to the drawings.

[System Configuration]

Figure 1:
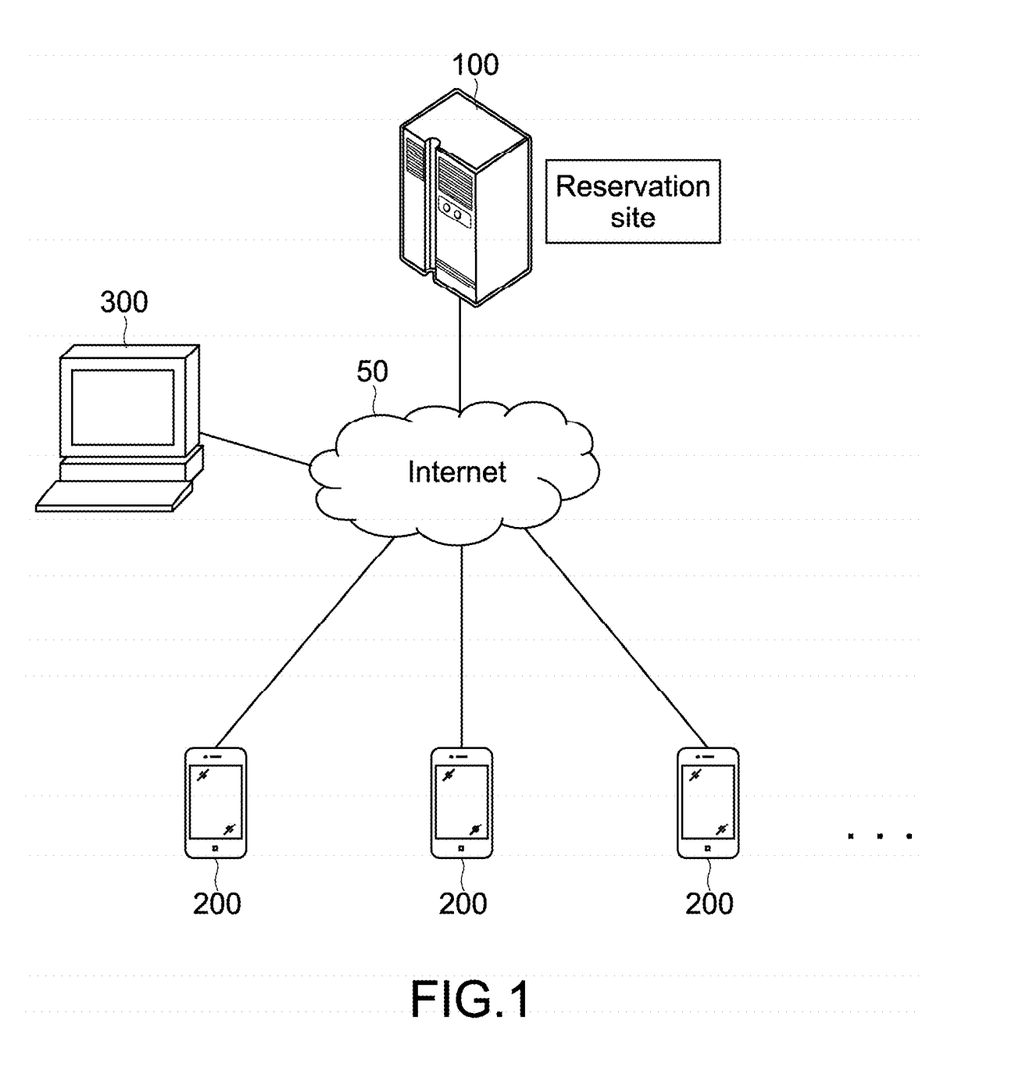
FIG. 1 A diagram showing a configuration of an accommodation facility evaluation system according to an embodiment of the present invention.

FIG. 1 is a diagram showing a configuration of an accommodation facility evaluation system according to this embodiment.

As shown in the figure, this system includes an accommodation facility reservation server 100 in the Internet 50 and a plurality of user terminals 200.

The accommodation facility reservation server 100 is a server managed by an operation company of an accommodation facility reservation site. The accommodation facility reservation server 100 is connected to the user terminals 200 and an accommodation facility terminal 300 via the Internet 50.

The user terminal 200 is a terminal carried by the user who reserves an accommodation facility such as a hotel and an inn. The user terminal 200 is, for example, a smartphone, a cellular phone, or a tablet PC (Personal Computer).

In response to an access request to the accommodation facility reservation site from the user terminal 200, the accommodation facility reservation server 100 generates a web page (HTML (HyperText Markup Language) document) including accommodation plan information or the like and sends back it to the user terminal 200.

The user terminal 200 accesses the accommodation facility reservation server 100, receives the web page, and displays it on a screen by a browser.

The user of the user terminal 200 executes reservation processing of an accommodation plan of a particular accommodation facility through the screen displayed by the browser.

The user terminal 200 is capable of sending (posting) a review indicating an evaluation and an impression about the facility, which was reserved and used by the user, to the accommodation facility reservation server 100. The accommodation facility reservation server 100 is capable of publishing this review in an introduction page of each accommodation facility or the like in the accommodation facility reservation site, for example.

The accommodation facility terminal 300 is a terminal apparatus used by employees and the like of the accommodation facility. The accommodation facility terminal 300 is, for example, a PC. The accommodation facility terminal 300 is capable of accessing the accommodation facility reservation server 100 and obtaining, from the user terminal 200, a reservation status, reserving user information, and the like about their facility.

Further, the accommodation facility terminal 300 is capable of recording actual check-in time and check-out time of the user who reserved accommodation and also capable of transmitting those information items to the accommodation facility reservation server 100.

[Hardware Configuration of Accommodation Facility Reservation Server]

Figure 2:
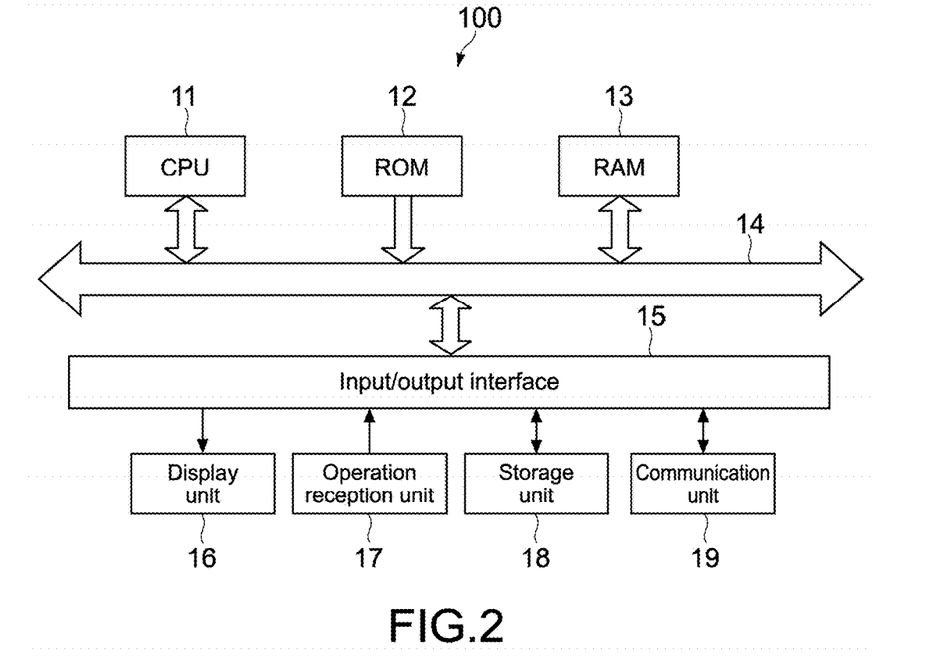
FIG. 2 A diagram showing a hardware configuration of an accommodation facility reservation server in the system.

FIG. 2 is a diagram showing a hardware configuration of the accommodation facility reservation server 100. As shown in the figure, the accommodation facility reservation server 100 includes a CPU (Central Processing Unit) 11, a ROM (Read Only Memory) 12, a RAM (Random Access Memory) 13, an input/output interface 15, and a bus 14 that connects them to one another.

The CPU 11 appropriately accesses the RAM 13 or the like depending on needs and generally controls all the blocks of the accommodation facility reservation server 100 while performing various types of arithmetic processing. The ROM 12 is a nonvolatile memory that fixedly stores an OS, programs, and firmware such as various types of parameters that are executed by the CPU 11. The RAM 13 is used as a working region or the like of the CPU 11 and temporarily stores the OS, various applications being executed, and various types of data being processed.

To the input/output interface 15, connected are a display unit 16, an operation reception unit 17, a storage unit 18, a communication unit 19, and the like.

The display unit 16 is a display device using, for example, an LCD (Liquid Crystal Display), an OELD (Organic ElectroLuminescence Display), or a CRT (Cathode Ray Tube).

The operation reception unit 17 is, for example, a pointing device such as a mouse, a keyboard, a touch panel, or other input apparatus. If the operation reception unit 17 is a touch panel, the touch panel can be integral with the display unit 16.

The storage unit 18 is a nonvolatile memory, for example, an HDD (Hard Disk Drive), a flash memory (SSD; Solid State Drive), or other solid-state memory. The storage unit 18 stores the OS, various applications, and various types of data.

As will be described later, especially in this embodiment, the storage unit 18 includes an accommodation plan information database relating to accommodation plans whose reservations can be accepted via the accommodation facility reservation site, a review information database relating to the review information from the user, and a user information database relating to the user who has reserved any of the accommodation plans.

The communication unit 19 is, for example, an NIC (Network Interface Card) for Ethernet (registered trademark) and responsible for communication processing between the user terminal 200 and the accommodation facility terminal 300.

Although not shown in the figure, a hardware configuration of the accommodation facility terminal 300 is also the same as that of the accommodation facility reservation server 100.

[Hardware Configuration of User Terminal]

Figure 3:
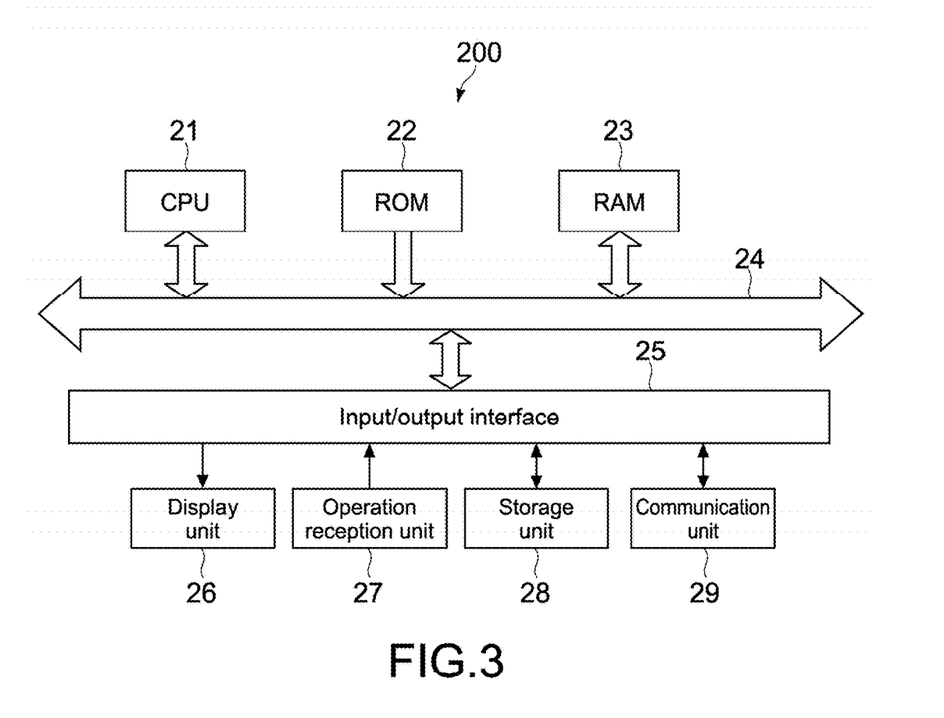
FIG. 3 A diagram showing a hardware configuration of a user terminal in the system.

FIG. 3 is a diagram showing a hardware configuration of the user terminal 200. As shown in the figure, the hardware configuration of the user terminal 200 is also basically the same as the hardware configuration of the accommodation facility reservation server 100.

That is, the user terminal 200 includes a CPU 21, a ROM 22, a RAM 23, an input/output interface 25, a bus 24 that connects them to one another, a display unit 26, an operation reception unit 27, a storage unit 28, and a communication unit 29. Here, the display unit may be externally connected to the user terminal 200. An HDD (Hard Disk Drive) may be used as the storage unit 28.

The CPU 21 controls the blocks such as the storage unit 28 and the communication unit 29 and executes communication processing with the accommodation facility reservation server 100 and various types of data processing.

The operation reception unit 27 is, for example, an input apparatus such as a touch panel and a button and integral with the display unit 26.

The storage unit 28 is, for example, a flash memory and stores various types of software such as an OS and a browser, data necessary for executing them, and the like. In particular, in this embodiment, the storage unit 28 records texts and images that can be materials of a user's review about an accommodation facility while the user uses the accommodation facility. Also, the storage unit 28 stores the recorded texts and images and a review application for editing the review based on those review materials after use of the accommodation facility.

The review application may store, from the accommodation facility reservation server 100, information on an estimated check-in time (estimated start time of facility use) and an estimated check-out time (estimated end time of facility use) of a plan whose accommodation the user has reserved. The estimated check-in time and the estimated check-out time are, for example, stored by receiving the review application from the accommodation facility reservation server 100.

The communication unit 29 is a module for connecting to a mobile network and responsible for the communication processing with the accommodation facility reservation server 100.

Although not shown in the figure, the user terminal 200 may include a position information acquisition unit for obtaining position information of the user terminal 200. The position information can be transmitted together with a time stamp to the accommodation facility reservation server 100 at any time.

As the method of obtaining the position information, conceivable are one using a GPS (Global Positioning System) sensor, one using trilateration based on field intensity between a plurality of wireless base stations and the terminal of a 3G/LTE (Long Term Evolution) circuit to which the user terminal 200 can be connected, one using a dedicated check-in/check-out apparatus such as a tag reader placed in the accommodation facility (e.g., accommodation facility terminal 300), and an image analysis (one that matches photographs (and time stamps) of the accommodation facility that are stored in advance and photographs (and the time stamps) taken by the user).

The above-mentioned various methods may be switched to one another based on a communication condition around the user terminal 200 or an ON/OFF state or the like of a GPS sensor. In this case, the user terminal 200 may obtain information on a radio wave condition of the accommodation facility from, for example, the accommodation facility reservation server 100 in advance.

Although not shown in the figure, the user terminal 200 includes a camera as hardware for executing image recording processing by the review application.

[Database Configuration of Accommodation Facility Reservation Server]

Figure 4:
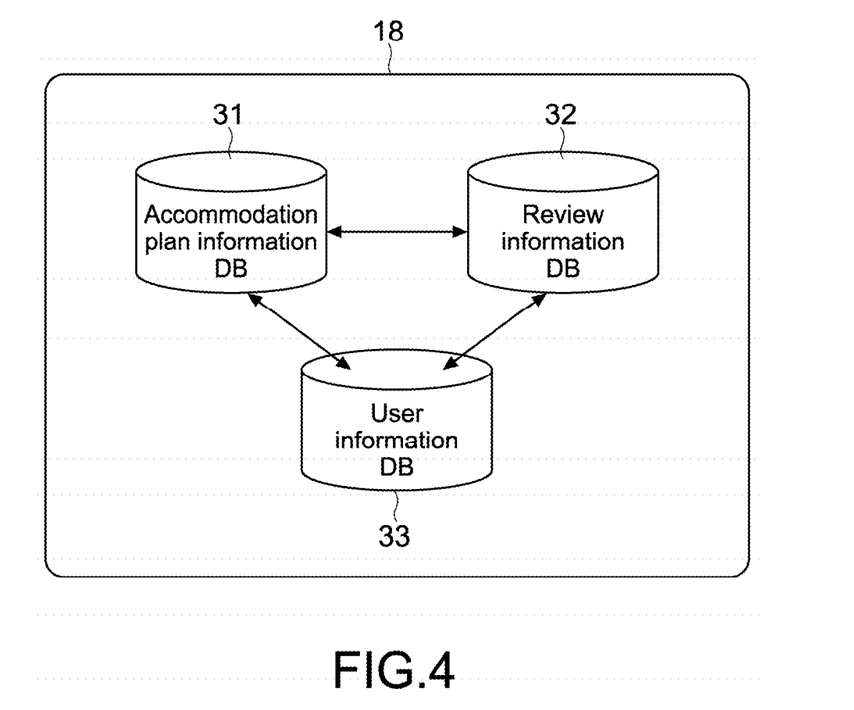
FIG. 4 A diagram showing a configuration of a database of the accommodation facility reservation server.

FIG. 4 is a diagram showing a configuration of a database of the accommodation facility reservation server 100.

As shown in the figure, the accommodation facility reservation server 100 includes an accommodation plan information database 31, a review information database 32, and a user information database 33 in the storage unit 18.

The accommodation plan information database 31 stores information on accommodation plans whose reservations can be accepted by the accommodation facility reservation server 100. Specifically, the accommodation plan information database 31 stores plan name information, accommodation facility information (accommodation facility name, location, evaluation, etc.), plan contents (charge, available rooms, with/without meals, plan setting data, etc.), and the like for each accommodation facility and for each accommodation plan.

The review information database 32 stores the review information posted by users of the user terminal 200 for each accommodation facility. The review information is formed of, for example, user names (user IDs), and texts and/or images.

The user information database 33 stores information on the user who has reserved the accommodation plan. Specifically, the user information database 33 stores information on a user ID, a user name, a communication destination (mail address, etc.), an estimated check-in time, an estimated check-out time, and the like.

As described above, the accommodation facility reservation server 100 is capable of receiving, from the user terminal 200, position information with the time stamp of the user terminal 200 at any time. Further, the actual check-in/check-out time information of the user can be received from the accommodation facility terminal 300. Those received information items can be stored in the storage unit 18, for example, as a part of the user information database 33.

[System Operations]

Next, operations of the thus configured accommodation facility reservation server 100 and user terminal 200 will be described. The operations are executed by cooperation of the hardware of the CPU 11, the communication unit 19, and the like of the accommodation facility reservation server 100, the hardware of the CPU 21, the communication unit 29, and the like of the user terminal 200 with the software stored in the storage unit 18 of the accommodation facility reservation server 100 and the storage unit 28 of the user terminal 200. In the following explanation, for the sake of convenience, it is assumed that the CPU 11 and the CPU 21 are operation subjects.

(Operations of User Terminal)

Figure 5:
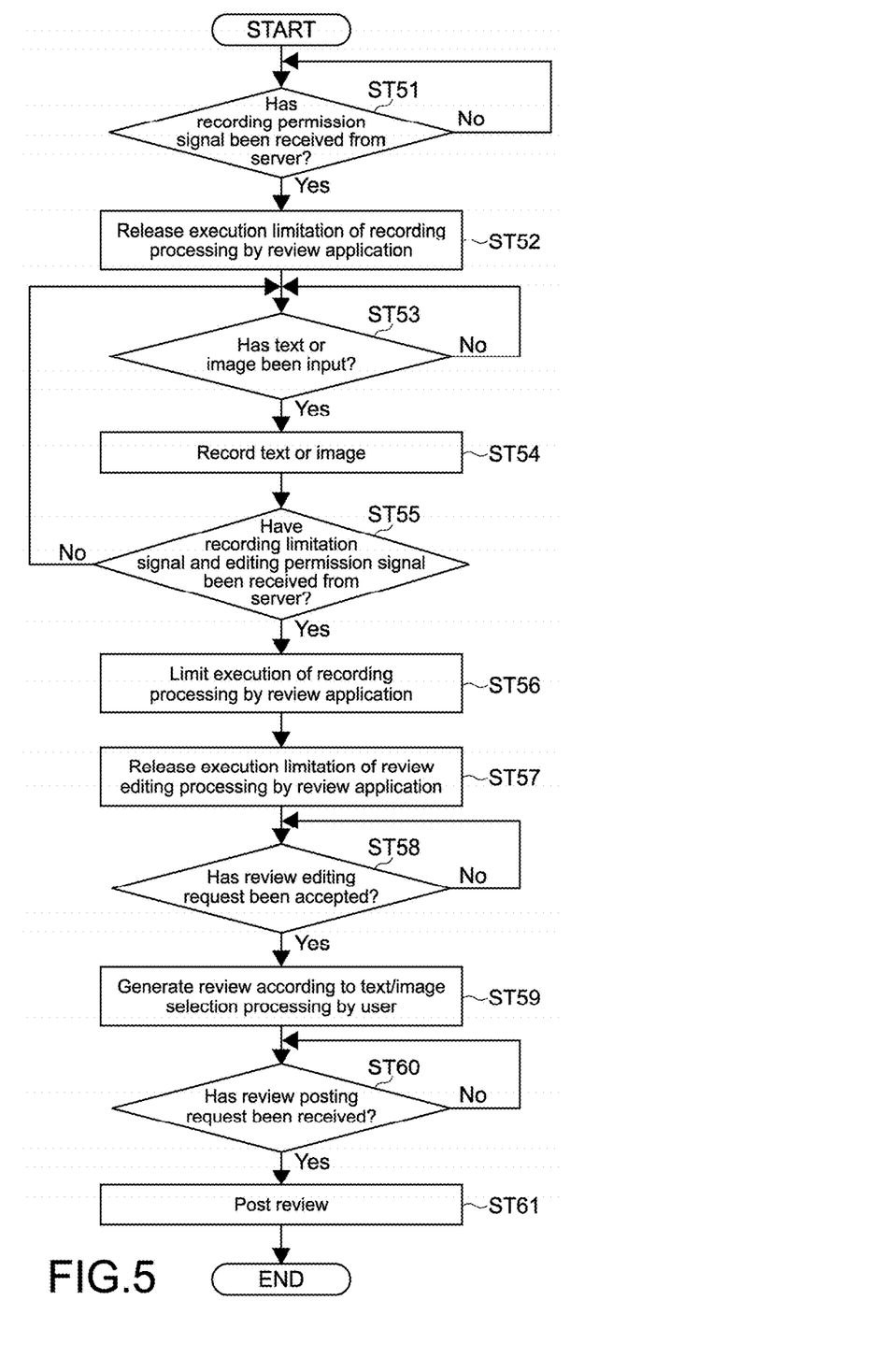
FIG. 5 A flowchart showing a flow of review material recording processing and review editing processing by the user terminal.

FIG. 5 is a flowchart showing a flow of review material recording processing and review editing processing by the user terminal 200.

As shown in the figure, the CPU 21 of the user terminal 200 first determines whether or not a recording permission signal of the text or image serving as the review material of the review application has been received from the accommodation facility reservation server 100 (Step 51).

Before reception of the recording permission signal, the review application is held in a state in which execution of the recording processing of the review material is limited. As will be described later, the recording permission signal is transmitted when the estimated check-in time of the user comes.

If it is determined that the recording permission signal has been received (Yes), the CPU 21 releases the execution limitation of the recording processing of the review material of the review application (Step 52). Specifically, the state in which the execution of the recording processing is locked is released by a key included in the recording permission signal.

Here, the review application may output information (e.g., pop-up display or sound) for urging the user to record the text or image serving as the review material. The information may be output by the review application itself or may be transmitted from the accommodation facility reservation server 100 to the user terminal 200 and output via the review application.

Subsequently, the CPU 21 determines whether or not the text or image has been input by the review application (Step 53). If the input has been made (Yes), the CPU 21 stores the text or image in the storage unit 28 (Step 54). For example, the text is input by the keyboard or the like and the image is input by a camera capturing it.

Subsequently, the CPU 21 determines whether or not the recording limitation signal of the review material and the editing permission signal of the review have been received from the accommodation facility reservation server 100 (Step 55).

As will be described later, the recording limitation signal and the editing permission signal are transmitted when the estimated check-out time of the user comes. Both the signals do not need to be separated signals and may be a single signal.

If it is determined that the recording limitation signal and the editing permission signal have been received (Yes), the CPU 21 limits the execution of the recording processing of the review material of the review application (Step 56).

Along with this, the CPU 21 releases the execution limitation of the review editing processing using the recorded review material of the review application (Step 57). Before reception of the editing permission signal, the review editing processing is held in a state in which the execution is limited by the above-mentioned key lock, for example.

Here, the review application may output information (pop-up and sound) for urging the user to perform the review editing processing using the recorded text or image. The information may be output by the review application itself or may be transmitted from the accommodation facility reservation server 100 to the user terminal 200 and output via the review application.

Subsequently, the CPU 21 determines whether or not a review editing request has been received from the user on the review editing screen displayed by the review application, for example (Step 58).

If it is determined that the review editing request has been received (Yes), the CPU 21 generates the review according to text or image selection processing by the user (Step 59).

Subsequently, the CPU 21 determines whether or not a posting request of the generated review has been received from the user on the review editing screen, for example (Step 60).

If it is determined that the review posting request has been received (Yes), the CPU 21 transmits the review posting request to the accommodation facility reservation server 100 (Step 61).

The review posting request includes, in addition to the user name (or the user ID), time stamp information of the review material (text and photograph) used for the generated review.

Figure 6:
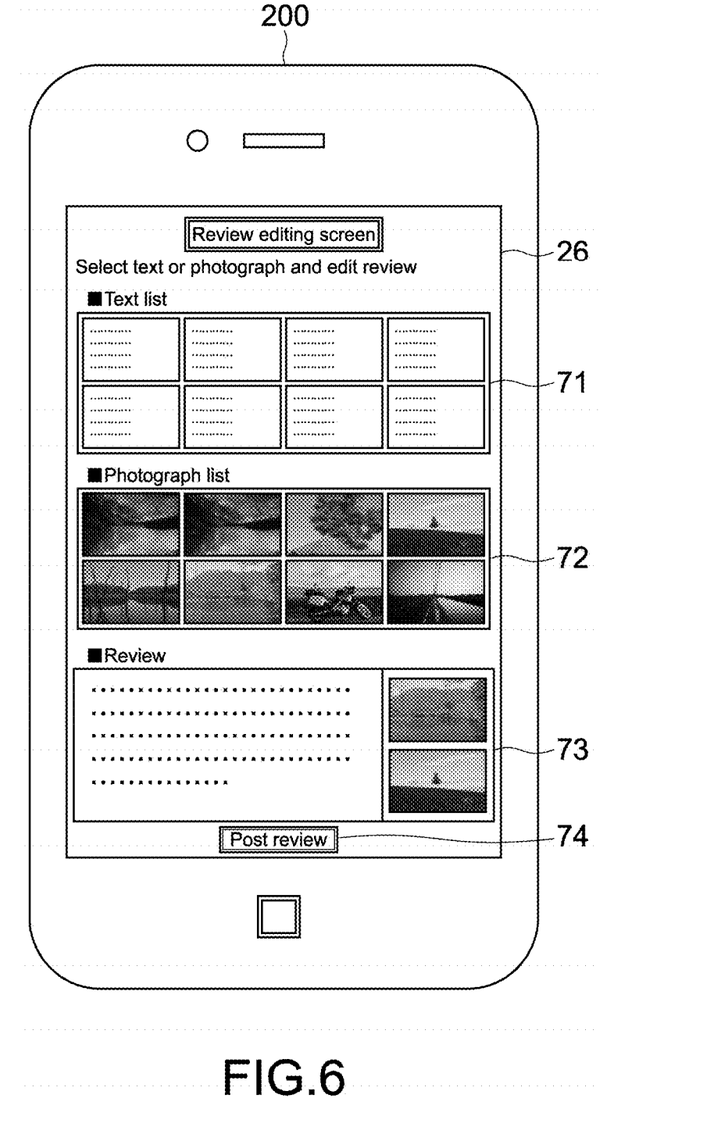
FIG. 6 A diagram showing an example of a review editing screen displayed on the user terminal.

FIG. 6 is a diagram showing a review editing screen displayed on the display unit 26 of the user terminal 200 by the review application.

As shown in the figure, the review editing screen includes a text list region 71, a photograph list region 72, and a review generation region 73. The text list region 71 indicates a list of text files recorded in the state in which the limitation of the recording processing of the review material is released. The photograph list region 72 indicates a list of image (photograph) files recorded in the same manner. The review generation region 73 is for selecting the text and photograph and generating the review.

The review is generated by, for example, the user dragging and dropping a text of the text list region 71 and a photograph of the photograph list region 72 to the review generation region 73 with a finger.

Specifically, the user can drag and drop one or more text files or image files to the review generation region from the text list region 71 and the photograph list region 72. If a plurality of files are dragged and dropped, they are displayed in the review generation region 73 in a dragging and dropping order or in a time stamp order.

The user can edit the text displayed in the review generation region 73 by, for example, the keyboard (including additional text input and text deletion). The user can also delete the photograph dragged and dropped in the review generation region 73.

Then, if a review posting button 74 is pressed by the user, for example, in the state in which the review generation region 73 is displayed, the review posting request is received by the review application.

(Operation of Accommodation Facility Reservation Server)

Figure 7:
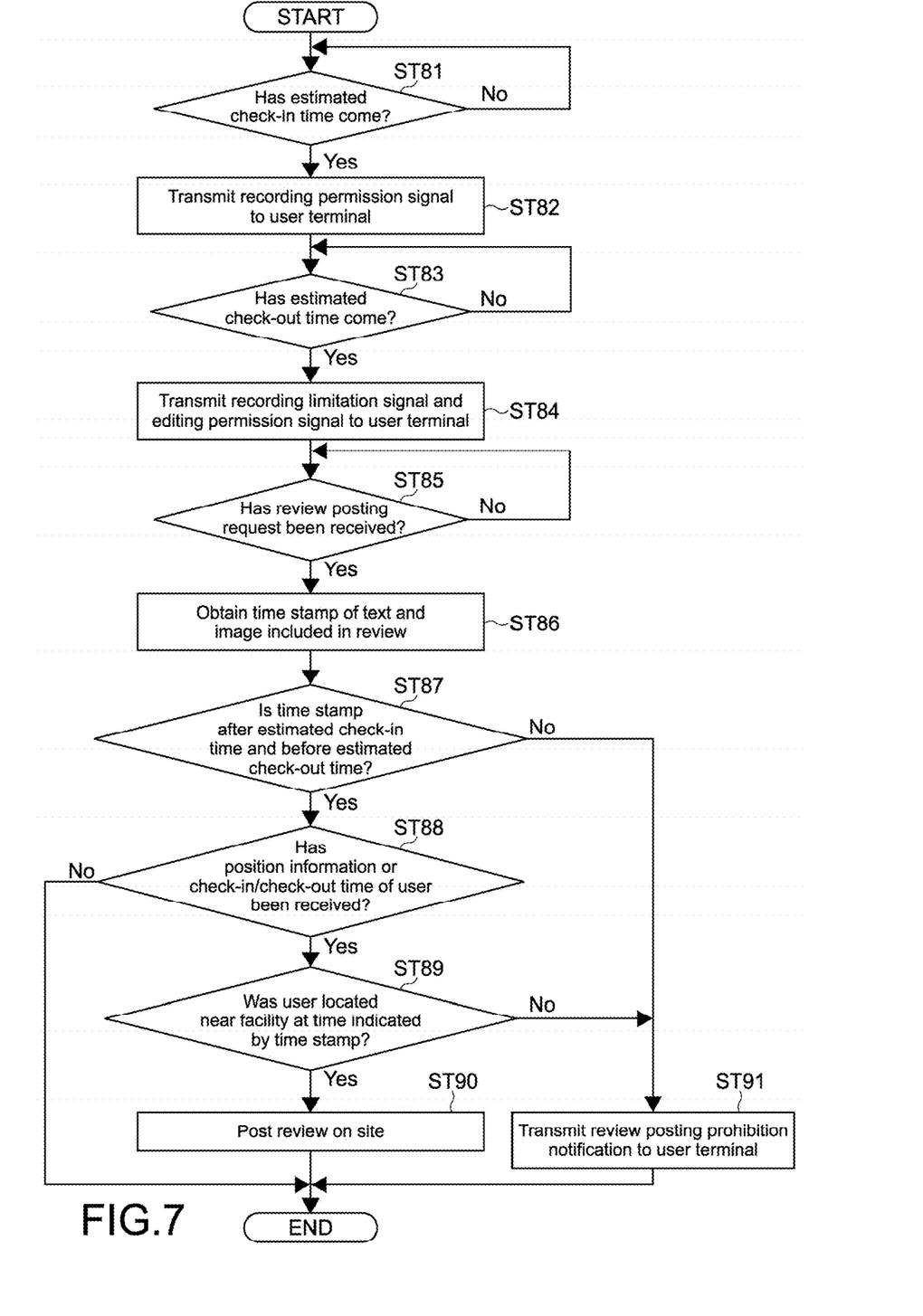
FIG. 7 A flowchart showing a flow of review publishing processing by the accommodation facility reservation server.

FIG. 7 is a flowchart showing a flow of review posting processing by the accommodation facility reservation server 100.

As shown in the figure, by consulting the user information database 33, the CPU 11 of the accommodation facility reservation server 100 determines whether or not the estimated check-in time of the user who had reserved a certain plan has come (Step 81).

If it is determined that the estimated check-in time has come (Yes), the CPU 11 transmits the recording permission signal to the user terminal 200 of the target user (Step 82). With this, as described above, the execution limitation of the recording processing of the review material is released in the review application of the user terminal 200.

Subsequently, the CPU 11 determines whether or not the estimated check-out time of the user has come by consulting the user information database 33 again (Step 83).

If it is determined that the estimated check-out time has come (Yes), the CPU 11 transmits the recording limitation signal and the editing permission signal to the user terminal 200 of the target user (Step 84). With this, in the review application of the user terminal 200, the recording of the review material is limited and the execution limitation of the review editing processing is released as described above.

Subsequently, the CPU 11 determines whether or not the review posting request has been received from the user terminal 200 (Step 85).

If it is determined that the review posting request has been received (Yes), the CPU 11 obtains a time stamp of the review material (text and photograph) included in the review posting request (Step 86).

Subsequently, the CPU 11 determines whether or not the time stamp of the review material is after the estimated check-in time and before the estimated check-out time (Step 87).

The recording permission signal and the recording limitation signal limit a period for which the text and photograph can be recorded at the user terminal 200 to be from the estimated check-in time to the estimated check-out time. Therefore, this processing of Step 87 is not essential. However, with this processing, in the review application, a possibility that a review material having a time stamp indicating a point of time outside the period is used for some reason is eliminated more reliably.

If it is determined that the time stamp is after the estimated check-in time and before the estimated check-out time (Yes), the CPU 11 determines whether or not the position information has been received from the user terminal 200 as a target or the check-in/check-out time information of the user as a target has been received from the terminal 300 of the accommodation facility where the target user stayed (Step 88).

If the position information or the check-in/check-out time information has been received (Yes), the CPU 11 determines, based on such information, whether or not the user was located near the accommodation facility at the point of time indicated by the time stamp of the review material included in the review posting request (Step 89).

If it is determined that the user was located near the accommodation facility at the point of time indicated by the time stamp of the review material (Yes), the CPU 11 accepts the review posting request and posts the review in a review display region for each accommodation facility in the accommodation facility reservation site (Step 90).

At this time, the CPU 11 may transmit a review posting completion notification to the user terminal 200 or the user terminal 200 may notify that the review posting is completed on the display unit 26 based on this notification.

If it is determined that the user was not located near the accommodation facility at the point of time indicated by the time stamp of the review material (No), the CPU 11 transmits the review posting prohibition notification to the user terminal 200 (Step 91).

Specifically, with the position information, the CPU 11 transmits the review posting prohibition notification in response to a review posting request including a review material having a time stamp that is a point of time when the user terminal 200 is located away from the accommodation facility (that can be consulted from the accommodation plan information database 31) by a predetermined distance or longer (e.g., 100 m, 500 m, and 1 km).

With the check-in/check-out time information, the CPU 11 transmits the review posting prohibition notification in response to a review posting request including a review material having a time stamp indicating a point of time outside a period from the check-in time to the check-out time.

In this case, when the user terminal 200 receives the review posting prohibition notification, the user terminal 200 may display, on the display unit 26, for example, the fact that the review posting is not permitted because the time stamp of the review material is not during use of the accommodation facility and further notify the user of the fact that the review should be re-edited.

In this manner, according to this embodiment, the accommodation facility reservation server 100 and the user terminal 200 cause the user to record information during use of the facility and then use it for creating the review. Thus, it is possible to reduce the complications when the user creates the review about the used facility. Further, a material usable for the review is limited to those recorded during use of the facility. Thus, the real time impression about the facility used by the user can be reflected to the review after use of the facility.

Modified Example

The present invention is not limited only to the above-mentioned embodiment and may be variously changed without departing from the gist of the present disclosure.

In the above-mentioned embodiment, the text and image recorded by the review application in the user terminal 200 are stored in the user terminal 200, and selected by the user and then uploaded into the accommodation facility reservation server 100 together with the review posting request. However, the text and image are uploaded and stored in a predetermined storage area (e.g., storage area allocated for each user) of the review information database 32, for example, of the accommodation facility reservation server 100 at each recording time or on a regular basis.

Further, in the above-mentioned embodiment, the review editing processing is executed by the review application in the user terminal 200. The review editing processing may be executed on the accommodation facility reservation server 100. That is, the editing function as shown in FIG. 6, which is provided by the review application, may be provided by the accommodation facility reservation server 100 on a predetermined web site (e.g., on a plan information page of a hotel where the user stayed or on my page provided for each user).

In the above-mentioned embodiment, the accommodation facility reservation server 100 determines, based on the position information of the user or the actual check-in/check-out time, whether or not the user was actually located near the accommodation facility at the point of time indicated by the time stamp of the review material and transmits the review posting prohibition notification depending on the result. However, this determination may be executed by the review application of the user terminal 200.

That is, even with the image or text recorded between the estimated check-in time and the estimated check-out time, if it is determined based on the position information with the time stamp that the user terminal 200 is not located near the accommodation facility (in predetermined distance range of 500 m, 1 km, or the like) at the point of time indicated by the time stamp of the image or text or if it is determined that check-in is not actually performed or check-out is already performed, the review application may restrict the use of the image or text with the time stamp for generating the review.

In this case, the review application does not need to receive the recording permission signal and the recording limitation signal and the editing permission signal from the accommodation facility reservation server 100 and to limit the execution of the recording processing and the editing processing based on the estimated check-in time and the estimated check-out time by itself.

Thus, the review material may be enabled to be recorded after the reservation processing by the user is completed, and correspondingly, the review application may determine the time stamp when the review is edited, for example. Specifically, the review application may restrict, on the review editing screen, the drag and drop of a review material having a time stamp between the estimated check-in time and the estimated check-out time or a review material recorded when the user is not located near the accommodation facility.

In this case, the user terminal 200 stores the position information of the user by the position information acquisition unit together with the time stamp at any time and receives the actual check-in/check-out time information from the accommodation facility terminal 300. Alternatively, the user terminal 200 may record the check-in/check-out time by a dedicated check-in/check-out apparatus such as a tag reader provided to the accommodation facility terminal 300.

In the above-mentioned embodiment, the review editing processing in the review application is permitted when the estimated check-out time comes. However, the review editing processing may be permitted when the reservation is completed or the estimated check-in time comes. That is, during use of the accommodation facility of the user, even before the estimated check-out time comes, editing and posting of the review based on the review material recorded by the user may be permitted.

In the above-mentioned embodiment, the example in which the accommodation facility reservation server 100 receives an accommodation reservation via the accommodation facility reservation site has been shown. However, the review application may execute accommodation facility reservation processing. That is, the application may obtain accommodation plan information from the accommodation facility reservation server 100 and may transmit a reservation request of a plan selected by the user based on it to the accommodation facility reservation server 100. In this case, the estimated check-in time and the estimated check-out time are input and stored in the application during the reservation processing.

In the above-mentioned embodiment, the text and image recorded by the review application does not need to be uploaded and published as the review but as, for example, real tweeting information in the accommodation facility on a predetermined web site (e.g., on each accommodation facility information page of the accommodation facility reservation server 100) at any time. With this, the accommodation facility reservation server 100 can publish a real time impression or an image during use of the facility of the user on the web site other than the review posted after use of the facility. Thus, realistic information different from the review of the facility can be provided.

In the above-mentioned embodiment, the example in which the present invention is applied to the accommodation facility evaluation system has been shown. However, the present invention is not limited thereto and can be applied to any system as long as it is a system in which the user uses some facility, for example, a golf course, a restaurant, or a beauty parlor and an evaluation (review) about the used facility can be posted on a predetermined site.

DESCRIPTION OF REFERENCE NUMERALS 11, 21 CPU
18, 28 storage unit
19, 29 communication unit
31 accommodation plan information database
32 review information database
33 user information database
50 Internet
71 text list region
72 photograph list region
73 review generation region
74 review posting button
100 accommodation facility reservation server
200 user terminal
300 accommodation facility terminal

The invention claimed is:

1. An information processing apparatus, comprising:
a first memory configured to store reservation information relating to a use reservation for a facility of a user having a user terminal, the reservation information including an estimated facility use start time and an estimated facility use end time, the user terminal including an application, wherein the application is configured to edit a review using image information, wherein the user terminal is a smartphone, a cellular phone or a tablet PC;
at least one second memory configured to store computer program code; and
at least one processor configured to access said at least one second memory and operate according to said computer program code, said program code including:
control code configured to cause said at least one processor to:
  obtain, from a user database, a predetermined estimated facility use start time and a predetermined estimated facility use end time,
  transmit a recording permission signal for permitting a recording by the application to the user terminal when the predetermined estimated use start time comes and to transmit a recording limitation signal for limiting the recording by the application to the user terminal when the predetermined estimated facility use end time comes,
  transmit an editing permission signal for permitting the editing by the application to the user terminal when the predetermined estimated facility use end time comes,
  receive, from the user terminal, a posting request of a review of the user about the facility, the posting request including the image information, wherein the image information has a time stamp indicating a recording date and time, and wherein the control code is further configured to cause said at least one processor to:
    control, based on the reservation information, the posting request to: i) prevent a posting of the review including the image information having a time stamp if the time stamp is after the predetermined estimated facility use end time, ii) prevent the posting of the review including the image information if the time stamp is before the predetermined estimated facility use start time, and iii) prevent the posting of the review before the predetermined estimated facility use end time.

2. The information processing apparatus according to claim 1, wherein:
the user terminal is configured to obtain position information of the user terminal, wherein the user terminal is configured to obtain the position information by at least one of:
  a): a GPS (Global Positioning System) sensor, b): trilateration based on field intensity between a plurality of wireless base stations and the user terminal, c): a dedicated check-in/check-out apparatus such as a tag reader placed in the accommodation facility, and d): an image analysis of the accommodation facility and a second photograph, the first memory is configured to store, as the reservation information, facility position information indicating a position of the facility whose use is reserved by the user, the control code is further configured to cause said at least one processor to receive, from the user terminal, user position information indicating a position of the user terminal, the control code is further configured to cause said at least one processor to control first memory to store the user position information in association with a time stamp indicating a first point of time of a reception of the user position information, and the control code is further configured to cause said at least one processor to control, based on the user position information, the review posting request to prevent posting of the review including the image information having a time stamp indicating a second point of time when the position of the user terminal is away from the position of the facility by a predetermined distance or longer.

3. The information processing apparatus according to claim 1, wherein the application is capable of recording the image information, and wherein the control code is further configured to cause said at least one processor to transmit information for urging the user to perform the recording by the application to the user terminal when the predetermined estimated facility use start time comes.

4. The information processing apparatus according to claim 3, wherein the control code is further configured to cause said at least one processor to receive recorded image information at each time of recording and upload the image information into a predetermined web site.

5. The information processing apparatus according to claim 3, wherein the control code is further configured to cause said at least one processor to transmit information for urging the user to perform the editing processing by the application to the user terminal when the predetermined estimated facility use end time comes.

6. The information processing apparatus according to claim 1, wherein the control code is further configured to cause said at least one processor to transmit to the user terminal, if the posting request includes image information having a time stamp indicating the first point of time is outside a period of time from the predetermined estimated facility use start time to the predetermined estimated facility use end time, information indicating that the image information is prohibited to be used for the review.

7. The information processing apparatus according to claim 1, wherein the image information is a photograph taken by the user terminal, and wherein the control code is further configured to obtain the time stamp of the photograph included in the review posting request.

8. An information processing method, comprising:

storing reservation information relating to a use reservation for a facility of a user having a user terminal, the user terminal including an application, wherein the application is capable of editing a review using image information, the reservation information including an estimated facility use start time and an estimated facility use end time, wherein the user terminal is a smartphone, a cellular phone or a tablet PC;

obtaining, from a user database, a predetermined estimated facility use start time and a predetermined estimated facility use end time;

transmitting, to the user terminal, a recording permission signal for permitting a recording by the application to the user terminal when the predetermined estimated use start time comes and to transmit a recording limitation signal for limiting the recording by the application to the user terminal when the predetermined estimated facility use end time comes;

transmitting, to the user terminal, an editing permission signal for permitting the editing by the application to the user terminal when the predetermined estimated facility use end time comes;

receiving, from the user terminal, a posting request of a review of the user about the facility, the posting request including the image information, wherein the image information has a time stamp indicating a recording date and time; and controlling, based on the reservation information, the posting request to: i) prevent posting of a review including the image information having a time stamp after the predetermined estimated facility use end time, ii) prevent posting of the review including the image information having the time stamp before the predetermined estimated facility use start time, and iii) prevent posting of the review including the image information before the predetermined estimated facility use end time.

9. The information processing method according to claim 8, wherein the user terminal is capable of obtaining position information of the user terminal, further comprising:

storing, as the reservation information, facility position information indicating a position of the facility whose use is reserved by the user;

receiving, from the user terminal, user position information indicating a position of the user terminal;

storing the user position information in association with a time stamp indicating a first point of time of the reception; and controlling, based on the user position information, the review posting request to prevent posting of the review including the image information having a time stamp indicating a second point of time when the position of the user terminal is away from the position of the facility by a predetermined distance or longer.

10. The information processing method according to claim 8, wherein the application is capable of recording the image information, the information processing method further comprising transmitting information for urging the user to perform the recording by the application to the user terminal when the predetermined estimated facility use start time comes.

11. The information processing method according to claim 10, further comprising transmitting information for urging the user to perform the editing processing by the application to the user terminal when the predetermined estimated facility use end time comes.

12. The information processing method according to claim 8, further comprising transmitting to the user terminal, if the posting request includes image information having a time stamp indicating the first point of time is outside a period of time from the predetermined estimated facility use start time to the predetermined estimated facility use end time, information to the user terminal, the information indicating that the image information is prohibited to be used for the review.

13. The information processing method according to claim 8, further comprising:
receiving recorded image information at each time of recording; and
uploading the image information into a predetermined web site.

14. The information processing method according to claim 8, further comprising obtaining the time stamp of a photograph included in the review posting request, wherein the image information is the photograph taken by the user terminal.

15. The information processing method according to claim 8, further comprising:
determining, after the transmitting an editing permission signal, whether a posting request of a review of the user about the facility has been received;
if the posting request of the review of the user about the facility has not been received, repeating the determining whether the posting request has been received, and
if the posting request of the review of the user about the facility has been received:
performing the controlling the posting request, wherein the controlling the posting request further includes, when the time stamp is not in a time window starting at the estimated check-in time and ending at the estimated check-out time, transmitting a review posting prohibition notification to the user terminal.

16. A non-transitory computer readable recording medium that records a program that causes an information processing apparatus to execute steps comprising:
storing reservation information relating to a use reservation for a facility of a user having a user terminal, the user terminal including an application, wherein the application is capable of editing a review using image information, the reservation information including an estimated facility use start time and an estimated facility use end time;
obtaining, from a user database, a predetermined estimated facility use start time and a predetermined estimated facility use end time;
transmitting, to the user terminal, a recording permission signal for permitting a recording by the application to the user terminal when the predetermined estimated use start time comes and to transmit a recording limitation signal for limiting the recording by the application to the user terminal when the predetermined estimated facility use end time comes;
transmitting, to the user terminal, an editing permission signal for permitting the editing by the application to the user terminal when the predetermined estimated facility use end time comes;
receiving, from the user terminal, a posting request of a review of the user about the facility, the posting request including the image information, wherein the image information has a time stamp indicating a recording date and time; and controlling, based on the reservation information, the posting request to: i) prevent posting of a review including the image information having a time stamp after the predetermined estimated facility use end time, ii) prevent posting of the review including the image information having the time stamp before the predetermined estimated facility use start time, and iii) prevent posting of the review including the image information before the predetermined estimated facility use end time.

17. The non-transitory computer readable recording medium according to claim 16,
wherein the user terminal is capable of obtaining position information of the user terminal, the steps further comprising:
storing, as the reservation information, facility position information indicating a position of the facility whose use is reserved by the user;
receiving, from the user terminal, user position information indicating a position of the user terminal;
storing the user position information in association with a time stamp indicating a first point of time of the reception; and
controlling, based on the user position information, the review posting request to prevent posting of the review including the image information having a time stamp indicating a second point of time when the position of the user terminal is away from the position of the facility by a predetermined distance or longer.

18. The non-transitory computer readable recording medium according to claim 16,
wherein the application is capable of recording the image information, the steps further comprising transmitting information for urging the user to perform the recording by the application to the user terminal when the predetermined estimated facility use start time comes.

19. The non-transitory computer readable recording medium according to claim 18, the steps further comprising transmitting information for urging the user to perform the editing processing by the application to the user terminal when the predetermined estimated facility use end time comes.

20. The non-transitory computer readable recording medium according to claim 16, the steps including transmitting to the user terminal, if the posting request includes image information having a time stamp indicating the first point of time is outside a period of time from the predetermined estimated facility use start time to the predetermined estimated facility use end time, information to the user terminal, the information indicating that the image information is prohibited to be used for the review.

21. The non-transitory computer readable recording medium according to claim 16, the steps further comprising:
receiving recorded image information at each time of recording; and
uploading the image information into a predetermined web site.

22. The non-transitory computer readable recording medium according to claim 16,
wherein the image information is a photograph taken by the user terminal, and
wherein the steps further comprise obtaining the time stamp of the photograph included in the review posting request.

* * * * *